(12) United States Patent
Wörner

(10) Patent No.: US 6,572,077 B1
(45) Date of Patent: Jun. 3, 2003

(54) DOUBLE SAFETY MAGNETIC VALVE

(75) Inventor: Jürgen Wörner, Weitmars (DE)

(73) Assignee: Karl Dungs GmbH & Co., Urbach (DE)

(*) Notice: Subject to any disclaimer, the term of this patent is extended or adjusted under 35 U.S.C. 154(b) by 0 days.

(21) Appl. No.: 09/719,139

(22) PCT Filed: Jun. 5, 1999

(86) PCT No.: PCT/DE99/01648
§ 371 (c)(1),
(2), (4) Date: Dec. 7, 2000

(87) PCT Pub. No.: WO99/64770
PCT Pub. Date: Dec. 16, 1999

(30) Foreign Application Priority Data

Jun. 12, 1998 (DE) .......................... 198 26 076

(51) Int. Cl.[7] .............................................. F16K 31/02
(52) U.S. Cl. ............................ 251/129.18; 251/129.19
(58) Field of Search ...................... 251/129.15, 129.18, 251/129.19, 129.2

(56) References Cited

U.S. PATENT DOCUMENTS 5,246,199 A * 9/1993 Nuomoto et al. ...... 251/129.15
5,579,741 A * 12/1996 Cook et al. ......... 251/129.15 X

FOREIGN PATENT DOCUMENTS

| AT | 366 803 | 5/1982 |
| DE | 25 10 788 | 9/1976 |
| DE | 195 25 384 | 1/1997 |
| JP | 58-134284 | 8/1983 |
| WO | WO 96/34219 | 10/1996 |

* cited by examiner

Primary Examiner—Henry C. Yuen
Assistant Examiner—John Bastianelli
(74) Attorney, Agent, or Firm—Reed Smith LLP

(57) ABSTRACT

A double safety magnetic valve with two valves being accommodated in a housing, both axially displaceable valve disks thereof are disposed coaxially to, one another and each lifts from its respective valve seat through an axial movement in opening direction against the spring pressure of a first and second closing spring respectively, wherein the second, in flow direction of the double safety magnetic valve inner valve disk comprises as adjustment element a magnetic armature and the first, i.e. outer valve disk is motion-coupled with the inner valve disk in opening direction.

16 Claims, 3 Drawing Sheets

DOUBLE SAFETY MAGNETIC VALVE

BACKGROUND OF THE INVENTION

1. Field of the Invention

The present invention is directed generally to a double safety magnetic valve and more particularly to a double safety magnetic valve with two valves being accommodated in a housing.

2. Description of Background of the Invention

A double safety magnetic valve of this kind became known, for example, by the DE 195 25 384 A1. Such double safety magnetic valves are used in particular as safety magnetic valves on the gas input side of gas heat generators.

In the double safety magnetic valve known from the DE 195 25 384 A1 the two valve disks are disposed axially on top of one another in a housing and each cooperates with its own valve seat. The valve disks are each part of two adjustment elements independent of each other, the second of which is guided axially displaceably in the first. Both adjustment elements are opened by a common magnetic drive each against the action of a closing spring, wherein the two closing springs perform the closing stroke of both valve disks completely independent of one another when the magnet is switched off. Thus the safety requirements for gas safety valves can be met.

Although a compact construction has been enabled with the known double safety magnetic valves and thus on one hand a space-saving and on the other hand substantially cheaper producable unit, the axial overall height is still relatively large due to the valve disks and adjustment elements which are axially displaceable as well as disposed behind one another. Due to the ever increasing miniaturization, generally a further reduction of dimensions of the known double safety magnetic valve and in particular of its axial height is aimed at. Furthermore, mounting of the known double safety magnetic valve is very difficult since the valve disk, being the second one in flow direction of the double safety magnetic valve, must be threaded through the valve opening of the first valve disk.

It is hence the object of the invention to design a double safety magnetic valve of the aforementioned type even more compact in axial direction (opening direction).

SUMMARY OF THE INVENTION

According to the invention this object is solved in a manner which is equally surprisingly simple and effective in that the outer (first) valve disk, being the first one in flow direction of the double safety magnetic valve, surrounds the inner (second) valve disk and both their valve seats are combined to a common valve seat, which surrounds the only valve opening, and the second (inner) closing spring of the inner (second) valve disk is supported on the outer (first) valve disk or on an adjustment element thereof.

In contrast to the double safety magnetic valve known from the DE 195 25 384 A1, two valve seats do not have to be machined with high expenditure of time and labor, but only one single valve seat. Mounting of the device becomes easier since the parts do not have to be brought near to two seats and a smaller device can be more easily handled. The inventive double safety magnetic valve can be produced cheaper since less machining occurs and the dimensions become smaller. In addition to the axial overall height being drastically reduced, the flow values through the inventive double safety magnetic valve (multi-functional armature) become comparable to those of a single seat valve due to the inventive reduction of both valve functions to a common seat. The inventive double safety magnetic valve can be extended to all sizes and all kinds of valves, hence with the same housing a series with several variants can be realized, for example, single magnetic valve, double magnetic valve, or multi-functional valve with various regulators.

The inner (second) closing spring of the inner (second) valve disk is supported on the outer (first) valve disk or on the adjustment element thereof, for example on a peripheral shoulder or on the base of the adjustment element of the outer (first) valve disk. The inner (second) closing spring can, for example, be disposed between the two adjustment elements, perferably in an annular gap or in an opening of the inner magnetic armature open in opening direction.

Naturally, the invention is not limited to two valves or valve disks, but can be used also for three or more valve disks disposed coaxially, which are nested into one another.

In an advantageous development of this embodiment a common flat bearing surface for both valve disks is provided on the common valve seat. This measure has the advantage that both valve seats can be produced in a single process by machining of the common, in particular flat bearing surface or bearing surface without steps.

In an alternative development two axially off-set bearing surfaces can be provided on the common valve seat for one valve disk respectively. For example, both valve seats can be constructed on different planes on the common valve seat.

For an optimal sealing effect, for a flat bearing surface an elastomer sealing means of the valve disk cooperating with said flat bearing surface is pointed or for a pointed bearing surface a sealing means of the valve disk cooperating with said pointed bearing surface is flat. All variants of the seat arrangement are possible, for example both pointed, both flat, both on the same axial height, both axially off-set to one another, each also vice versa, etc.

Further, particularly preferred are such developments of the double safety magnetic valve where a bearing surface for an adjustment element (regulator element) of a flow regulator, with the adjustment element being axially moveable in the valve opening, is also provided on the common valve seat. This measure has the advantage that three functions (two valves and one flow regulation) are brought together on one seat. The closed position of the adjustment element in the valve opening can be exactly defined by bearing on the common valve seat. The adjustment element can for example be a rod, the free diskshaped end of which extending into the valve opening bears all around on the common valve seat in the closed position.

In an alternative development a bearing or regulator surface for an adjustment element provided upstream in front of the two valve disks or valves can be provided on the common valve seat. In particular if the adjustment element engages over both valve disks in a pot-shaped manner, they are additionally covered by the adjustment element.

In order to be able to check the tightness of the inventive double safety magnetic valve a sealing check opening is provided on the common valve seat, which opens into the space between the two valve disks.

A separate guide of the inner valve disk or its adjustment disk can be dispensed with if the inner valve disk or the magnetic armature is guided axially displaceably within the outer valve disk or its adjustment element or within a guide element of the outer valve disk.

It is particularly advantageous, if the outer valve disk is motion-coupled with the inner valve disk in opening direction. Thus, the outer valve disk is also lifted from the common valve seat at the same time with the inner valve disk. In closing direction, however, both valves are not motion-coupled, for them to be able to perform their closing lift completely independent from one another.

In a development of this embodiment the outer valve disk or the adjustment element thereof can engage behind the magnetic armature in opening direction.

In order to be able to produce the double safety magnetic valve with particularly low production costs, the housing of the two valves is designed preferably as extruded profile or as a diecast part. For such extruded profiles it is also possible to laterally attach the sealing control required for gas safety valves.

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention.

The invention is shown in the drawing and is more closely described by means of embodiments.

DESCRIPTION OF THE PREFERRED EMBODIMENTS

Figure 1:
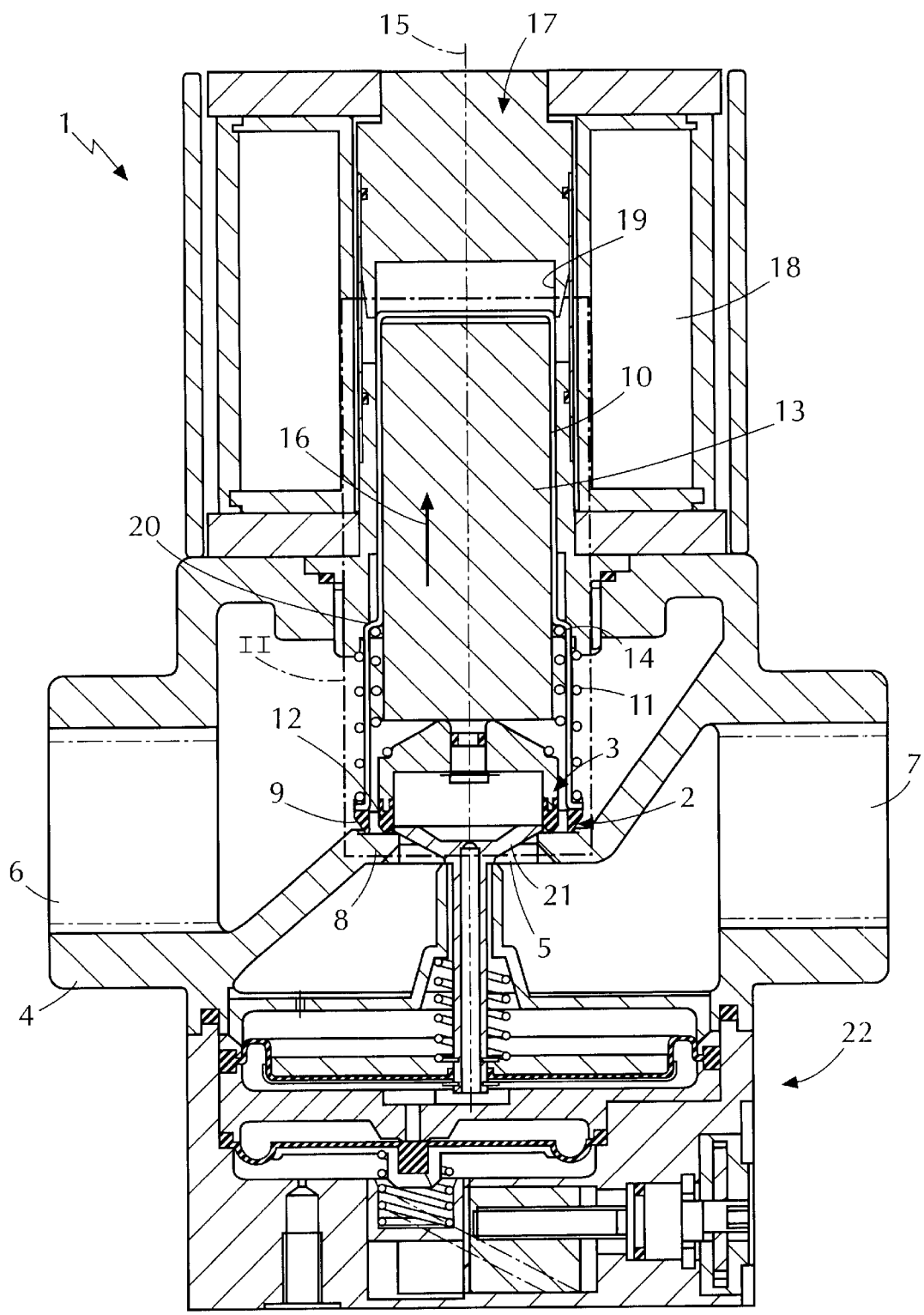
FIG. 1 shows a first embodiment of the inventive double safety magnetic valve in a longitudinal section.

In FIG. 1 a double safety magnetic valve is denoted with 1, the two valves 2 and 3 thereof, which are circuited in series, are accommodated in a common housing 4. This housing 4 is partitioned by a valve opening 5 into a gas entry space 6 and a gas exit space 7, wherein the valve opening 5 is surrounded by a valve seat 8.

The first (outer) valve 2 on the input side, i.e., the first one in flow direction of the double safety magnetic valve 1, consists of an annular first (outer) valve disk 9, an adjustment (actuator) element (hollow armature or bushing) 10 connected to the valve disk 9 and a first (outer) closing spring 11. The second (inner) valve 3 on the output side consists of an annular second (inner) valve disk 12, a magnetic armature 13 connected to this valve disk 12 and a second (inner) closing spring 14.

Figure 2:
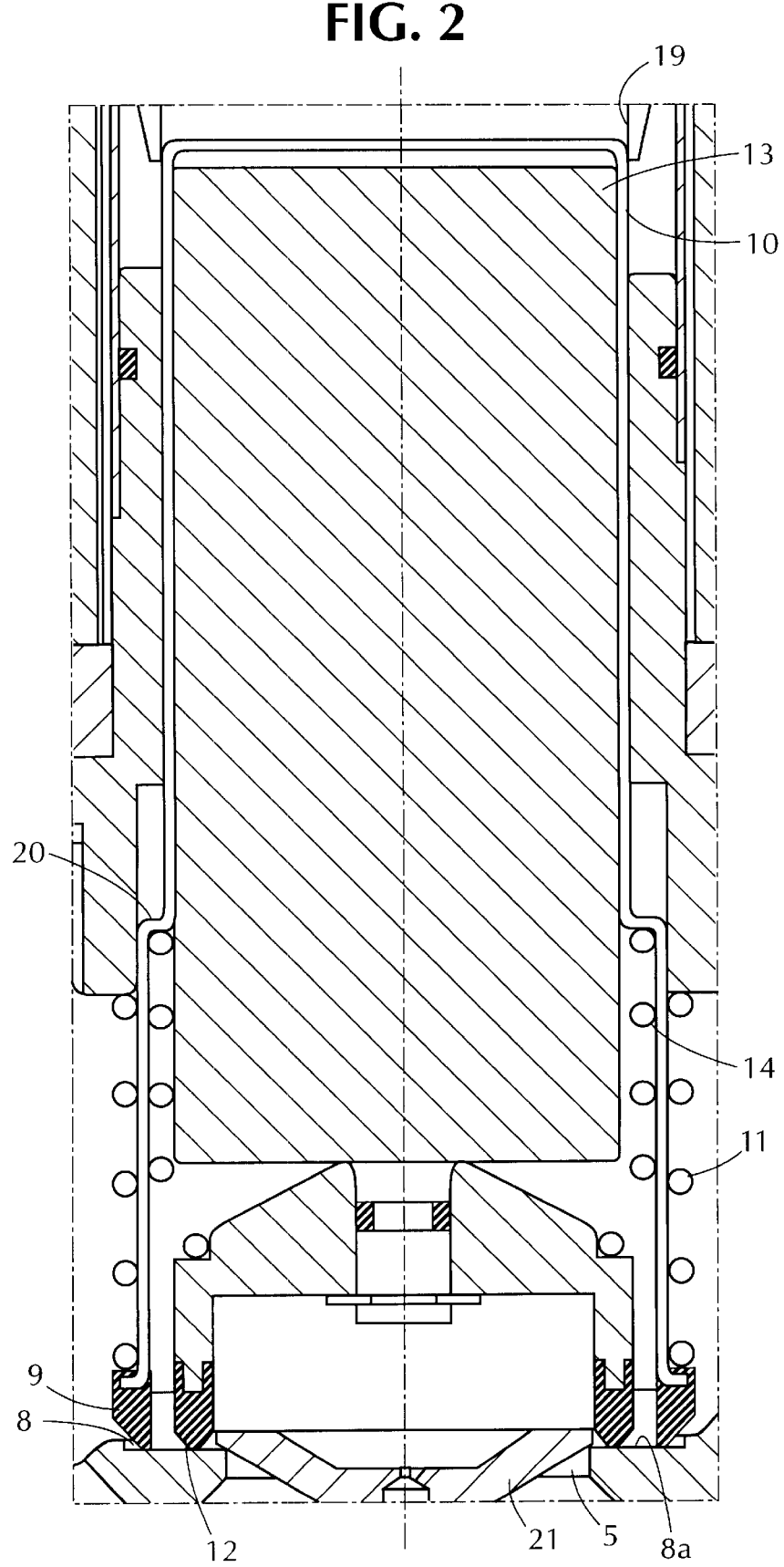
FIG. 2 shows an enlarged view of the double safety magnetic valve of FIG. 1 in the region of its valve opening according to cut II.

The two valves 2,3 and their respective valve disks 9,12 are disposed coaxially to one another with respect to a common axis 15, wherein the outer (first) valve disk 9 annularly surrounds the inner (second) valve disk 12. The valve seat 8 serves with its bearing surface 8a (FIG. 2) as common valve seat for both valve disks 9,12, which each lift by an axial movement in opening direction 16 from the common valve seat 8. A common magnetic drive 17 with a magnetic coil 18 and a guide opening 19, in which the adjustment (actuator) element 10 is guided axially displaceably, serves for opening the two valves 2,3. The magnetic armature 13 is itself guided axially displaceably in the adjustment (actuator) element 10, wherein the adjustment (actuator) element 10, which is designed pot-shaped, engages behind the magnetic armature 13 in opening direction 16 and is thus motion-coupled with the magnetic armature 13 in opening direction 16.

The outer closing spring 11 is supported on the housing 4, whereas the inner closing spring 14 is supported inside the adjustment element 10 on a peripheral shoulder 20. In the shown closed state of the double safety magnetic valve 1, the outer closing spring 11 therefore supplies the force for closing both valve disks 9,12 or both valves 2,3. Both valves because the inner closing spring 14 supports itself against the outer closing spring 11 which is thus relieved.

Magnetic force lines emerge when the magnetic coil 18 is excited, which attract the magnetic armature 13 together with the inner valve disk 12 in opening direction 16. Due to the motion-coupling, the outer valve disk 9 is also lifted from the common valve seat 8 at the same time with the inner valve disk 12. After switching off the magnetic coil 18 the closing springs 11, 14 effect for each valve 2,3 a closing independent from one another. The force of the inner closing spring 14 closes the inner valve disk 12 or the inner valve 3.

In case the outer valve 2 does not close, for example because the adjustment element 10 is jammed in the guide opening 19, the inner closing spring 14 is dimensioned such that nevertheless enough force is present for closing the inner valve disk 12 or the inner valve 3 in this case as well. This means that the inner valve 3 closes if the outer valve 2 closes (lift of the inner valve disk 12 relative to the outer valve disk 9: 1 mm) and if the outer valve 2 does not close due to malfunctioning (lift of the inner valve disk 12 relative to the outer valve disk 9: nominal lift+1 mm). For opening of both valves 2,3 a stronger magnet is not necessary compared with known double safety magnetic valves having valves disposed axially behind one another, despite the stronger outer closing spring 11, since the outer closing spring 11, as described above, is relieved by the inner closing spring 14.

In order to control the flow through the valve opening 5, an adjustment element (regulator element) 21 which is Y-shaped in cross-section is provided which engages through the valve opening 5 and which is axially displaceable. The adjustment element (regulator element) 21 is adjusted by means of a flow regulator 22 known per se according to an output pressure desired in the gas exit space 7. In its closed position shown in FIG. 2, the adjustment element (regulator element) 21 also bears on the flat bearing surface 8a of the common valve seat 8 with its free disk-shaped end, wherein the diameter of the disk-shaped end is larger than the diameter of the valve opening 5.

Figure 3:
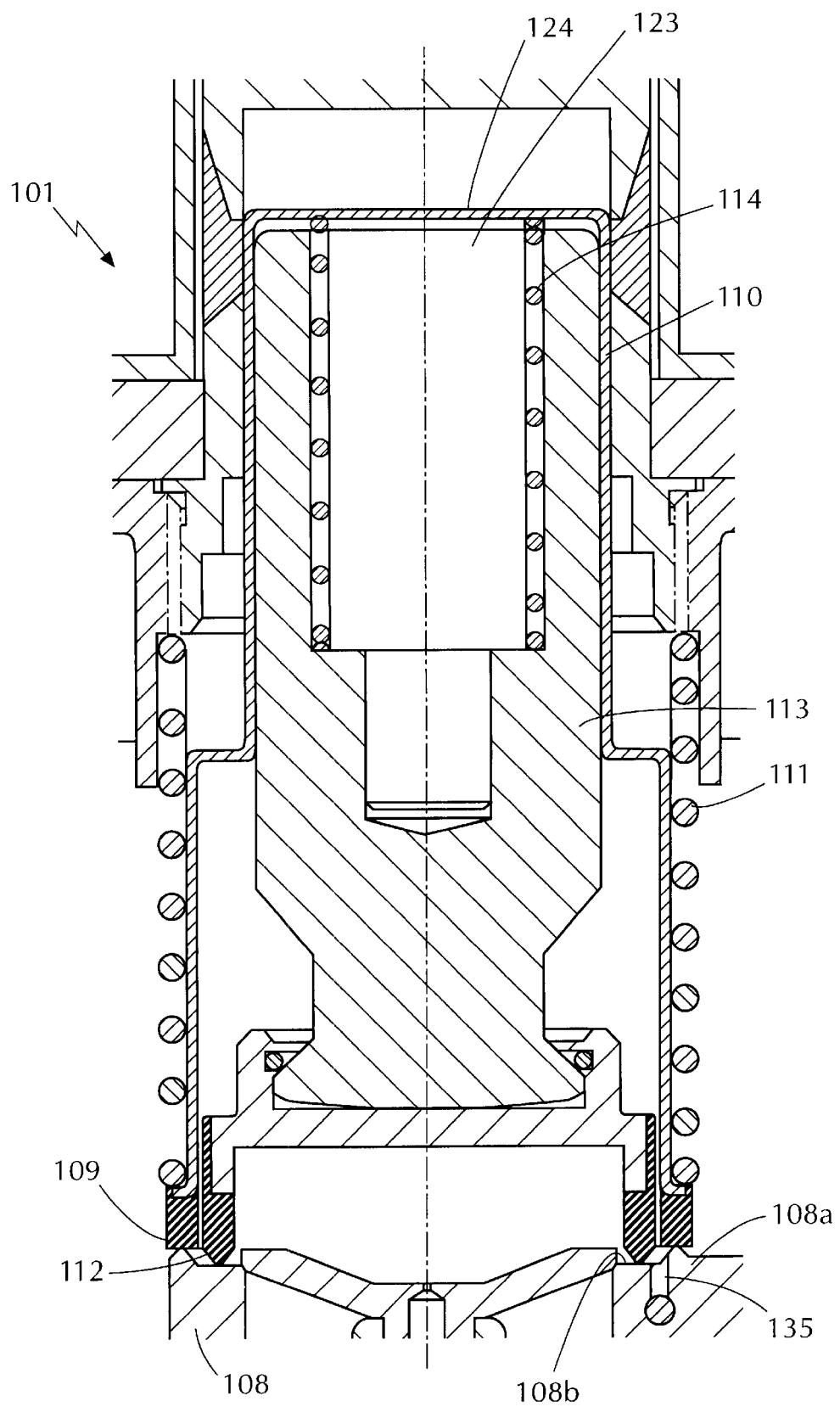
FIG. 3 shows in an enlarged view corresponding to FIG. 2 a second embodiment of the inventive double safety magnetic valve, wherein the inner (second) closing spring is supported on the base of the outer (first) adjustment element.

In contrast to this first embodiment, in the double safety magnetic valve 101 shown in FIG. 3 the inner closing spring 114 is accommodated within the opening (blind bore) 123 in the magnetic armature 113 and supports itself at one end on the magnetic armature 113 and on the other end on the base 124 of the pot-shaped adjustment element 110. This arrangement allows many possibilities for the spring dimensioning. The advantage of the dependently supported closing springs 111 and 114 consists in that in case of jamming of the magnetic armature 113 in the adjustment element 110, the strong outer closing spring 111, which so far stored the closing force for both valve disks 109, 112, closes the remaining intact outer valve disk 109.

In this embodiment, the common valve seat 108 does not comprise a common flat bearing surface for both valve disks 109 and 112, but the two bearing surfaces 108a and 108b are disposed axially off-set to one another. The outer bearing surface 108a is pointed and the elastomer sealing means of the outer valve disk 109 is flat. In contrast, the inner bearing surface 108b, which at the same time serves as bearing surface for the adjustment element 21, is flat and the elastomer sealing means of the inner valve disk 112, which cooperates with this bearing surface 108b, is pointed. Furthermore, a sealing-check-opening 135 is provided on the common valve seat 108, which leads into the annular space between both valve disks 109,112, such that a sealing check of the double seat valve 101 is possible.

It is of course to be understood that various changes may be made to the embodiments of the double safety magnetic valve described above without departing from the scope of the invention. Additional advantages and modifications which will readily occur to those skilled in the art from consideration of the specification and practice of the invention are intended to be within the scope and spirit of the following invention.

I claim:

1. A double safety magnetic valve comprising:
    a housing:
        first and second valves both being accommodated in said housing, where said first and second valves further include first and second corresponding axially displaceable valve disks which are disposed coaxially to one another and each lifts from its respective valve seat through an axial movement in the opening direction against the spring pressure of a first and second closing spring respectively, wherein:
            the first valve disk being the first one in flow direction of the double safety magnetic valve surrounds the second valve disk and both their valve seats are combined to a single common valve seat, which surrounds the only valve opening, and the second closing spring of the second valve disk is supported on the first valve disk or on an actuator element that axially moves the first valve disk, the surface of the common valve seat between the first and second valve disks being flat;
            the second valve disk further comprises a magnetic armature and the first valve disk is motion-coupled with the second valve disk in the opening direction, wherein the magnetic armature is coupled to axially move the second valve disk in the closing direction independent of the first valve disk.

2. The double safety magnetic valve according to claim 1, wherein a common flat bearing surface for both valve disks is provided on the common valve seat.

3. The double safety magnetic valve according to claim 1, wherein two axially off-set bearing surfaces are provided on the common valve seat for one valve disk respectively.

4. The double safety magnetic valve according to claim 1, wherein for a flat bearing surface an elastomer sealing means of the valve disk cooperating with said flat bearing surface is pointed or for a pointed bearing surface a sealing means of the valve disk cooperating with said pointed bearing surface is flat.

5. The double safety magnetic valve according to claim 1, wherein a bearing surface for a regulator element of a flow regulator, with the regulator element being axially moveable in the valve opening, is also provided on the common valve seat.

6. The double safety magnetic valve according to claim 1, wherein a bearing or regulator surface for a regulator element provided upstream in front of the two valve disks is provided on the common valve seat.

7. The double safety valve according to claim 1, wherein a sealing check opening is provided on the common valve seat, which opens into the space between the two valve disks.

8. The double safety magnetic valve according to claim 1, wherein at least one of the second valve disk and the magnetic armature is guided axially displaceably within the first valve disk or the actuator element or within a guide element of the first valve disk.

9. The double safety magnetic valve according to claim 1, wherein the first valve disk or the actuator element engages behind the magnetic armature in the opening direction.

10. The double safety magnetic valve according to claim 1, wherein the second closing spring is supported on a peripheral shoulder of the actuator element of the first valve disk.

11. The double safety magnetic valve according to claim 1, wherein the second closing spring is supported on a base of the actuator element of the first valve disk.

12. The double safety magnetic valve according to claim 11, wherein the second closing spring is disposed in an opening of the magnetic armature which opening is open in opening direction.

13. The double safety magnetic valve according to claim 1, wherein the housing of the two valves is designed as extruded profile or as diecast part.

14. A double safety magnetic valve comprising:
    a magnetic armature;
    a housing;
    first and second valves disposed in said housing and including first and second corresponding axially displaceable valve disks disposed coaxially to one another, the first valve disk surrounding the second valve disk;
    a single valve seat common to both the first and second valve disks and surrounding the only valve opening, each valve disk lifting from the single valve seat through an axial movement in the opening direction against the spring pressure of a first and second closing spring respectively;
    wherein:
        the magnetic armature is coupled to axially move the second valve disk in the closing direction independent of the first valve disk whereby the second valve disk closes even when the first valve disk fails to close with the second valve disk;
        the first valve disk is motion coupled with the second valve disk in the opening direction; and
        the second valve disk is supported on the first valve disk or on an actuator element that actuates the first valve disk.

15. A double safety magnetic valve comprising:
    a magnetic armature;
    a housing;
    first and second valves disposed in said housing and including first and second corresponding axially displaceable valve disks disposed coaxially to one another, the first valve disk surrounding the second valve disk;
    a single valve seat common to both the first and second valve disks and surrounding the only valve opening, each valve disk lifting from the single valve seat through an axial movement in the opening direction against the spring pressure of a first and second closing spring respectively;
    wherein:
        the single valve seat has a flat surface and each valve disk has an annular pointed portion that abuts the flat surface of the single valve seat;

the magnetic armature is coupled to axially move the second valve disk;

the first valve disk is motion coupled with the second valve disk in the opening direction; and the second valve disk is supported on the first valve disk or on an actuator element that actuates the first valve disk.

16. A double safety magnetic valve comprising:

a magnetic armature;

a housing;

first and second valves disposed in said housing and including first and second corresponding axially displaceable valve disks disposed coaxially to one another, the first valve disk surrounding the second valve disk;

a single valve seat common to both the first and second valve disks and surrounding the only valve opening, each valve disk lifting from the single valve seat through an axial movement in the opening direction against the spring pressure of a first and second closing spring respectively;

wherein:

the surface of the single valve seat has a flat annular portion and at least one of the first and second valve disks has a pointed annular surface that abuts the flat annular portion of the single valve seat;

the magnetic armature is coupled to axially move the second valve disk;

the first valve disk is motion coupled with the second valve disk in the opening direction; and the second valve disk is supported on the first valve disk or on an actuator element that actuates the first valve disk.

* * * * *